(Model.)
J. E. WOOD.
HORSE HAY FORK.
No. 245,335. Patented Aug. 9, 1881.
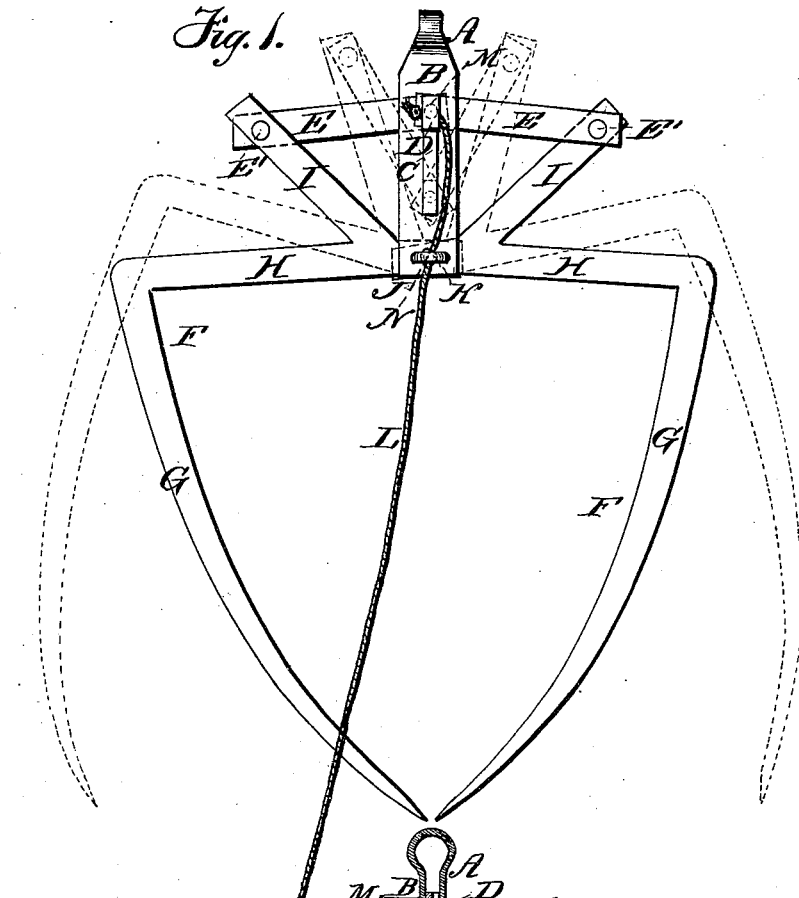
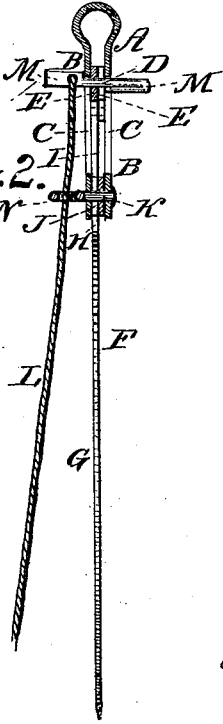
WITNESSES
INVENTOR
Julian E. Wood,
by C. A. Snow & Co.
ATTORNEYS

UNITED STATES PATENT OFFICE.

JULIAN E. WOOD, OF WASHINGTON, ILLINOIS.

HORSE HAY-FORK.

SPECIFICATION forming part of Letters Patent No. 245,335, dated August 9, 1881.

Application filed April 30, 1881. (Model.)

*To all whom it may concern:*

Be it known that I, JULIAN E. WOOD, of Washington, in the county of Tazewell and State of Illinois, have invented certain new and useful Improvements in Hay-Forks; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view, and Fig. 2 a vertical central sectional view.

Corresponding parts in the figures are denoted by like letters of reference.

This invention relates to forks for elevating and depositing hay, &c.; and it consists in certain improvements in the construction and operation of the same, substantially as will be hereinafter more fully described, and particularly pointed out in the claim.

Referring by letter to the drawings, A designates the head-piece, bent over, as shown, to form sides B B, having vertical slots C C, in which works the horizontal pivot-bolt D.

F F designate the tines, each consisting of inwardly-curved arm G and shoulder H, having upwardly and outwardly inclined arm I, which is hinged or pivoted to the outer end of arm E by pivot-bolt or rivet E'. The tines F are also hinged or pivoted together at their projecting points J of shoulder H by means of pivot-bolt K.

L designates the trip-rope, which is tied or otherwise secured to one of the projecting heads, M, of bolt D, and passes down through the eye N of bolt K to the hands of the operator.

The operation of my improved fork is as follows: The fork is opened to the position shown in dotted lines, Fig. 1 of the drawings, and thrust into the hay, the curved form of the tines automatically bringing their points together, as they enter the hay, to the position shown in solid lines, Fig. 1 of the drawings, which automatic action may be aided or accelerated by elevating the arms E by means of heads or knobs M at each end of bolt D, or by suitable ropes attached thereto. When in the latter position the hay is held securely on all sides by the pressure of the tines, and the pivot-bolt D being then slightly above the center of rivets or bolts E' on a horizontal plane, it is obvious that the weight of the hay assists in keeping the tines together. The fork is now elevated by means of a pulley-block and tackle, or other suitable mechanism, hooked into head-piece A and carried to the place where it is desired to deposit the hay, when, by a slight pull of the trip-rope L, the pivot-bolt D is drawn down below the horizontal center of pivots E', and the weight of the hay forces the tines apart, thus allowing the hay to drop and leaving the fork in position to grasp another load.

My invention is simple, durable, compact, and inexpensive, and will be found especially convenient for use in fine hay, straw, &c., and owing to the peculiar construction of the tines, they being thin and flat, as shown, great strength is obtained. The parts working between the sides of the head-piece have a free easy motion, without wabbling or unsteadiness, and the wear, if there be any, may be taken up by tightening the pivot-bolt K.

I am aware of the patent to Cramer, No. 93,520, August 10, 1869, and I claim nothing therein shown.

I am aware that guides for the trip-rope have been placed upon various parts of the fork, serving as guides only, and such construction is not sought to be covered in this application.

In my device the operating-tines are pivoted together by a single bolt, K, having an eye, N, and this device serves the double function of pivoting the tines and guiding the trip-rope directly under its point of attachment to the tripping attachment, and this relative position is at all times the same, whatever the position of the forks, to prevent binding or clogging of the rope in the guide.

What I claim as new is—

In a horse hay-fork, the eyed bolt K N, serving the double functions of pivoting the tines and guiding the trip-rope directly under the point of attachment with the trip-arms, combined with the tines G H I, slotted body C A B, the trip-arms E, and trip-rope L, as and for the purposes specified.

In testimony that I claim the foregoing as my own I have hereto affixed my signature in presence of two witnesses.

JULIAN EDWARD WOOD.

Witnesses:
GEO. W. TOBIAS,
J. P. WOOD.